United States Patent [19]
Frentress

[11] 3,972,069
[45] July 27, 1976

[54] MAGNETIC TAPE CONTROL SYSTEM CIRCUIT FOR SELECTIVELY BLOCKING THE EFFECT OF PARITY-CHECK CHARACTERS

[75] Inventor: Zane Frentress, Greenville, S.C.

[73] Assignee: Deering Milliken Research Corporation, Spartanburg, S.C.

[22] Filed: May 28, 1974

[21] Appl. No.: 473,882

Related U.S. Application Data

[60] Continuation of Ser. No. 327,411, Jan. 29, 1973, which is a division of Ser. No. 185,689, Oct. 10, 1971, Pat. No. 3,741,139.

[52] U.S. Cl. .................................................. 360/48
[51] Int. Cl.² .......................................... G11B 5/09
[58] Field of Search ......................... 360/47, 48, 74

[56] References Cited
UNITED STATES PATENTS
3,519,988  7/1970  Grossman .................. 340/146.1 AG

*Primary Examiner*—Vincent P. Canney
*Attorney, Agent, or Firm*—Curtis, Morris & Safford

[57] ABSTRACT

A circuit for use with a control system in which interleaved pairs of records and parity characters following each interleaved pair of records are recorded on magnetic tape, with each of the interleaved pairs of records having at its ends a stop-command-forward character and a stop-command-reverse character, the circuit comprising gate means for passing read data from a magnetic tape reader to a utilization device, means for identifying the stop-command-reverse character and the stop-command-forward character, and a flip-flop for disabling the gate means in response to identification of one of the stop-command-characters at the end of a record and for enabling the gate means in response to identification of a different stop-command character at the beginning of a next record.

3 Claims, 8 Drawing Figures

MAGNETIC TAPE CONTROL SYSTEM CIRCUIT FOR SELECTIVELY BLOCKING THE EFFECT OF PARITY-CHECK CHARACTERS

This is a continuation of Application Ser. No. 327,411, filed Jan. 29, 1973, which in turn is a divisional application of Application Ser. No. 185,689, filed Oct. 10, 1971, now U.S. Pat. No. 3,741,139.

The invention relates generally to magnetic tape operated control systems for cyclically-operated machines which have a large number of outputs that are to be selectively operated during various cycles of operation and particularly to a parity-check character disabling circuit for such a system.

There are a great many applications which require control of a large number of selected outputs in a cyclically-operated machine, and in which the selected outputs may vary from cycle to cycle. An example of such an application is in the metering of yarn in a carpet-tufting machine. Typically, such machines are of a conventional looper-needle type, or of a more recent type which employs pneumatic feed throuugh hollow needles. In the usual carpet-tufting machine of this type a row of needles is arranged across a moving web of backing material. Each of the needles is hollow and is fed with yarn from a spool. The needles are pushed through the backing material by a needle-bar, and metered lengths of yarn then are blown through the hollow needles to form loops or tufts projecting from the backing material on the side opposite from the needle-bar. The needles then are withdrawn from the backing, and the backing material advances a short distance, and the stitching cycle then is repeated, the nedles again being driven into the backing material, and another row of tufts formed. The height of the tufts is determined by the amount of yarn delivered to the needles during each stitching cycle. More yarn provides a higher loop; less yarn a lower loop, or not loop at all; if desired. Thus, carpets can be produced having a selected height pattern by selectively feeding different lengths of yarn to the needles to produce the various lengths of loops demanded by the selected pattern. Tufting machines of this kind are described in U.S. Pat. No. 3,089,442, of Joe T. Short, entitled "Tufting Method and Apparatus".

In such machines it has been found advantageous to feed the yarn to each needle during each stitching cycle at a constant rate. This constant rate of yarn delivery produces a carpet with an improved appearance, and reduces the possibility of the yarn being broken during the operation of the tufting machine. In order to produce a carpet having a variable height pattern (i.e., tufts of selectively different heights) on a constant-rate-of-yarn-delivery machine, it is necessary to control the time interval during which yarn is delivered to each of the needles in each stitching cycle. For example, if the constant yarn-delivery rate is 1/16th inch of yarn per 1/1,000 of a second (per millisecond), then to produce a loop of ¼th inch height the yarn-delivery system for that loop must be activated for eight milliseconds. To produce a loop of twice that height, i.e., ½ inch, the yarn-delivery system must be activated for 16 milliseconds. Machines for producing this kind of height-patterned carpets are described in U.S. Patent Appln. Ser. No. 535,640 of Joe T. Short et al, entitled "Controlled Delivery of Yarn," which is assigned to the same assignee as the present application.

In such carpet-tufting machine, a primary requirement is that the yarn-delivery to each needle function rapidly and reliably because such machines must be operated at speeds which produce carpets in commercial quantities, typically 10 to 15 feet a minute. Heretofore, the yarn-delivery controls have been the slowest element in the operation of such a carpet-tufting cachine.

A second necessity of such yarn-control systems is reliability of the control circuits, i.e., fault-free operation. Typically, carpet is produced in 15 foot widths, and the loops or tufts are spaced ⅛th inch from one another; so that 1,440 needles are required to produce tufts across the 15 foot width of the carpet. If one of the yarn-delivery controls is malfunctioning, there results down the length of the carpet a line of tufts produced by that needle which are either too high or too low. Since carpet is produced in an approximate rate of 12 ½ feet a minute, several feet of carpet usually will be produced before a flaw is detected. After detection, the carpet-tufting machine must be stopped until the malfunctioning control can be repaired or replaced. For machines which produce large quantities of carpet at such high speeds, obviously it is important that such down-time be minimized.

Heretofore, circuits have been proposed for controlling the length of yarn dispensed to each needle (at a constant yarn-delivery rate) during each stitching cycle. These prior art circuits included banks of binary counters, with two counters for each needle. Before each stitching cycle, a number proportional to the desired height of a tuft was stored in one of the two counters. Then, at the beginning of each stitching cycle, a master clock, providing timed pulses, was started; and yarn was delivered at a constant rate to each needle for a period of time determined by the number stored in the counter by using these clock pulses to count the counter down to zero, at which time the yarn-delivery system was turned off for the needle associated with that counter. Concurrently, another number corresponding to the tuft height was stored in the other counter.

A control arrangement for selectively controlling the time during which yarn is delivered to a large number of needles in a constant-rate-yarn-delivery system is disclosed in U.S. Pat. No. 3,741,139, supra. The system described in that patent employs a novel system of yarn-delivery control, and of identifying each yarn-delivery device by group and by element numbers within that group. At the beginning of a stitching cycle, all of the constant-rate-yarn-delivery devices are activated. Pre-programmed information arranged in blocks is stored in an electronic memory. The first block contains the addresses of those yarn-delivery elements which are to be turned off after a first instant of time, i.e., after a first amount of yarn is delivered. A second block of information stores the group and device numbers of those yarn-delivery elements which are to be turned off after a second instant of time; and so on to the last block for the last time interval, which corresponds to the maximum or longest length of yarn deliverable in one cycle. The reading of this information, block by block, and the resulting turning off of identified yarn-delivery devices is synchronized with the amount of yarn delivered.

By employing pre-programmed information storage arranged in blocks which correspond to steps of the yarn delivery elements, and by using an address in which each yarn-delivery device is identified by a group and number within the group, it is possible to construct such a control system which is both rapid and reliable. This system employs very few parts, and this adds to its speed of operation and reliability, as well as making it less expensive both in cost of materials and assembly.

Another feature of the system described above is that it permits the rapid production of variable-height-pattern tufted carpet in which the height pattern may extend for many feet before being repeated, or even indefinitely if desired. Heretofore machines could manufacture carpet whose repeat pattern was typically not more than about three feet. This length was limited by the machanical yarn-feeding mechanism. In this invention the length of the pattern-repeat is limited only by the number of pre-programmed instructions supplied to the machine, so that, for example, it is entirely practical to produce carpet with an 18 foot repeat pattern. Hence, since 15 and 18 foot lengths are typical rug sizes, by using this system it is possible to produce variable-height-pattern rugs in presently available carpet-tufting machines.

Another feature associated with the control arrangement of this system is the format in which the pre-programmed instructions, as to yarn-delivery duration, are stored. Typically, the instructions for one repeat of the tufting pattern, for example, one 3 foot length, are stored in a length of magnetic tape. Since carpet is made continuously and, therefore, the patterns are repeated, it is necessary to re-read the instructions on the tape from the beginning after each pattern is completed. After making one complete pattern, however, the tape is at the last instruction which is at the end of the tape. To repeat the pattern the machine next requires the first instruction which is at the beginning of the tape. In accordance with the above described system in order to obviate the need to stop and rewind the tape before each repeat, the instructions for one pattern are interlaced with the instructions for the next repeat (which, although usually the same as the first, may be different, if desired). By this arrangement the instructions for one pattern are read on the forward movement of the tape, and those for the next pattern or repeat are read on the reverse movement of the tape. Alternatively, the first half of the total instructions for one pattern of a carpet may be interlaced with those of the second half of the instructions for this pattern. By this arrangement, the first half of the instructions are read on the forward movement of the tape; and the second half are read on its reverse movement. When an end-of-the-tape instruction at either end is reached, the tape is reversed in direction. Thus, by shuttling the tape (forward and backward), carpets having repeated patterns can be produced continuously without the need to rewind the tape. A problem arises, however, with tapes using standart IBM format characters. In such tapes, at the end of each record of information (i.e., the instructions for one stitch cycle producing one transverse row of tufts), there is a "stop" signal followed by two "parity-check" characters. When the tape is read in the forward direction, the parity characters are ignored by turning off the "read" head. However, when running the tape in reverse direction, the parity characters cannot be ignored because the "read" head then is "on".

The present invention overcomes this problem by providing a circuit for automatically disregarding the parity-check characters when reading the tape in the reverse direction.

The circuit includes gate means for passing data read from the tape to the utilization device, in the example described herein the yarn feeding mechanisms, means for identifying the stop-command-reverse character and the stop-command-forward character, and means for disabling the gate means in response to identification of the stop-command reverse character at the end of a record and for enabling the gate means in response to identification of the stop-command-forward character at the beginning of a next record. Thus it provides an arrangement permitting the use of a tape with standard IBM format characters, with two records of instructions interleaved with each other, one in the forward direction and one in reverse, wherein the standard IBM "parity-check" format characters do not affect the reverse reading operation.

It is therefore the object of the present invention, is to provide an arrangement for reading pre-programmed, interleaved control instructions from a standard IBM format tape.

The construction of illustrative embodiments of the present invention, as well as further objects and advantages thereof, will become apparent from the following specification when read in conjunction with the accompanying drawings wherein:

Figure 1:
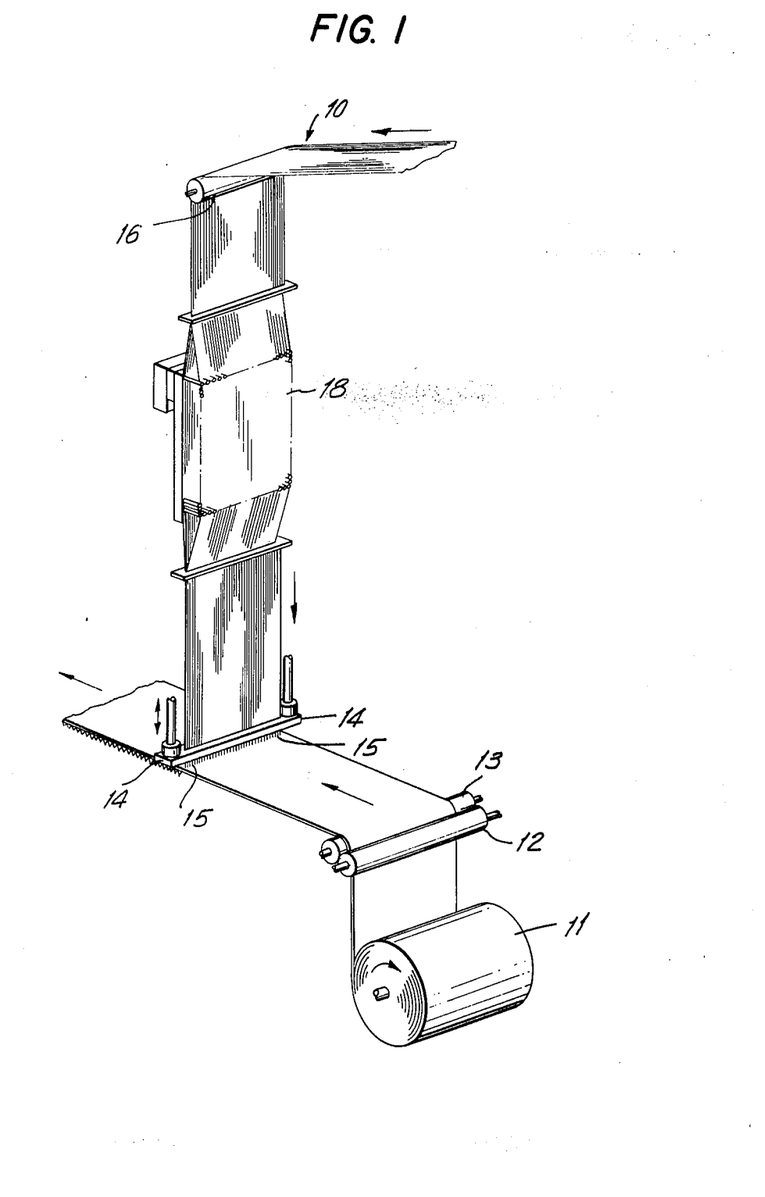
FIG. 1 is a perspective view of a portion of a carpet-tufting machine.

Referring now to FIG. 1, there is shown in perspective view a portion of a carpet-tufting machine, generally indicated at 10. A roll of backing material 11 is mounted near the machine, and this material is fed over guide rollers 12 and 13 to the area where the tufts are inserted in the backing material. A needle bar 14 extends across the width of the material. Individual hollow needles, shown generally at 15, are mounted in the needle bar 14. A typical carpet is 15 feet wide and has tufts spaced ⅛th inch from each other, or 1,440 tufts across the 15 foot width. The machine has one needle for each tuft, so that there are 1,440 needles on the needle bar 14. Each of the needles 15 is provided with an individual yarn source. The yarns are mounted on a creel (not shown) and are fed to the tufting machine from above the needle bar in a conventional fashion. The incoming yarns from the creel pass over roller 16 through a bank of yarn-delivery elements, shown generally at 18, and then on to the needles 15. Throughout this description of the invention, examples are given of specific times, dimensions, etc. It should be understood that these times and dimensions are exemplary and are included as an aid in explaining the invention. They are not limiting since other times, dimensions, etc. may be used without departing from the invention.

The specific example used herein is a hollow needle or "honesty" type tufting machine, operating to produce tufts on only one side of the backing material and at a rate of about 15 feet per minute. The invention is not limited to the "honesty" type machines, and may be used with the "looper" and other types of machines. Further, it is not limited to producing tufts only on one side of the backing material, since it may be used to make tufts on both sides of the backing. In the following description of the present invention an output rate of approximately 15 feet per minute has been chosen to aid the explanation since with this rate many of the associated time intervals are whole numbers. The invention, of course, is not limited to use at this speed.

A needle-bar movement cycle as used herein means the movement of the bar from an arbitrary initial position (e.g. its topmost position) through one complete cycle of motion back to this initial position. In the present example the needle-bar cycle lasts for approximately one-twenty-fifth of a second, i.e. 40 milliseconds, so that the needles on the needle bar pierce the backing material for about 80% of this time, i.e., 32 milliseconds. During each needle-bar cycle yarn is delivered to the needles, and the maximum time during which yarn can be so delivered will be referred to as the yarn-delivery cycle. This yarn-delivery cycle can be as long as, or shorter than, the needle-bar cycle, and can begin at any arbitrary time during the needle-bar cycle. In the present example, the yarn-delivery cycle lasts for 32 milliseconds, and begins 4 milliseconds after the beginning of the needle-bar cycle. Thus, when the needles 15 on the bar 14 first pierce the backing material 11, each of the 1,440 yarn-delivery elements in the bank 18 commences to meter the yarn to each needle at a constant rate. A typical speed of yarn feeding is 1/8th of an inch per millisecond. At the end of two milliseconds, i.e., after 1/8th inch of yarn is metered out, selected yarn-delivery elements are turned off and no more yarn is delivered to their associated needles. Likewise at the end of 3 milliseconds, 4 milliseconds, and so on, certain yarn-delivery elements are turned off. While the yarn is being delivered to the needles, air under pressure blows the yarn through the hollow needles 15, thereby forming the yarn into loops on the other side of backing material. The length of each tuft or loop is controlled by the amount of yarn released by its associated yarn-delivery element, and it is independent of the pressure of the pressure air forcing the yarn through the needles. As the needles are withdrawn from the backing material, the material advances slightly, for example one-eighth of an inch. A take-up reel (not shown) is provided for reeling up the finished tufted material as it leaves the tufting machine. The needle-bar and yarn-delivery cycles then are repeated. In the present example, the beginning of the yarn-delivery cycle coincides exactly with the beginning of the period during which the needles pierce the backing material. It should be appreciated that such coincidence is not essential for proper operation of the machine, nor of the control system of the invention, as the yarn-delivery cycle may be of any convenient duration, and during any portion, of the neelde-bar cycle, and the interval during which the needles pierce the backing material typically may vary from 80% to 90%of the needle-bar cycle.

Figure 2:
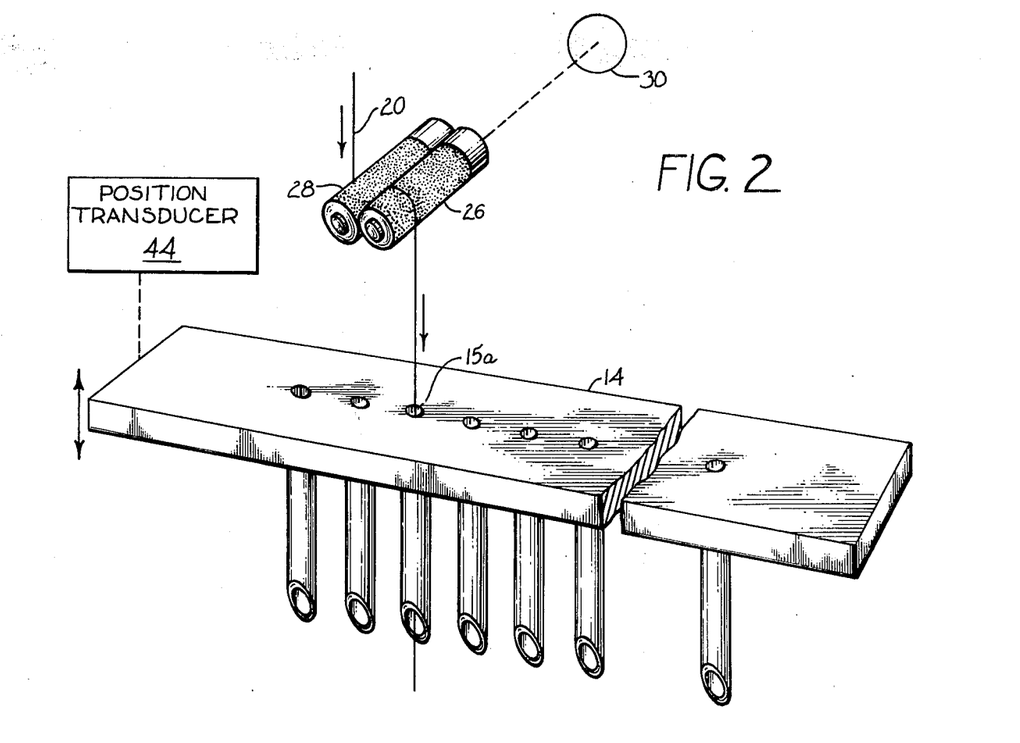
FIG. 2 is a perspective view of a portion of a single yarn-delivery device of the carpet-tufting machine of FIG. 1.

Referring now to FIG. 2, there is shown a perspective view of a portion of a single yarn-delivery arrangement for metering yarn to one of the needles on the needle bar, which arrangement is duplicated for each of the 1,440 yarn-delivery elements in the bank 18. The yarn 20 is metered to a hollow needle 15a in the needle bar 14 from the creel and guide roller (of FIG. 1). It passes between a drive roller 26 and an idler roller 28, held together by suitable resilient means (not shown), so that the yarn is gripped between these two rollers. The peripheral surfaces of the rollers may be provided with a material such as rubber, or plastic, which increases the friction between the yarn and the rollers to insure precise metering of the yarn. The drive roller 26 is mounted on the output shaft of a stepping motor (shown schematically at 30). When the needles on the bar 14 pierce the backing material, the stepping motor 30 begins stepping (with a clockwise rotation as shown in this view), thereby drawing yarn 20 from above, and releasing slack yarn to be blown through the needle 15a. The stepping motor 30 advances one step at a time in synchronism with the pre-programmed control. Each step of the motor takes approximately 1 millisecond and releases 1/16th inch of yarn. During each yarn-delivery cycle each stepping motor may be actuated anywhere from as few as two steps to as many as 32 steps. The first two steps, or 2 milliseconds of operation, are necessary to release the 1/8th inch of yarn which is required for the "back stitch", i.e., for the space between adjacent transverse rows of tufts on the backing material. If it is desired to have a "float," i.e., no tuft or loop protruding through the backing, then the stepping motor is turned off after two steps. If it is desired to produce, for example, a tuft ½ inch high, the stepping motor makes 18 steps, i.e. two for the back stitch, and 16 to make a loop ½ inch high. The maximum height of a loop in the present example, i.e., one of a maximum of 32 steps, is 15/16 inch which corresponds to stepping the motor for 32 steps and releasing 2 inches of yarn.

At the end of 32 milliseconds, all of the motors will have been turned off, and the needles on bar 14 are withdrawn from the backing material. The feed rolls 12 and 13 are driven by suitable means (not shown) to advance the backing material past the needle bar, and a corresponding pair of feed rollers (not shown) are employed to move the tuft-containing backing material toward a collection roll (also not shown). This advances the backing material 1/8 inch in the next 8 milliseconds, after which time the needles on the bar again pierce the backing material and the next row of tufts is formed.

Figure 3:
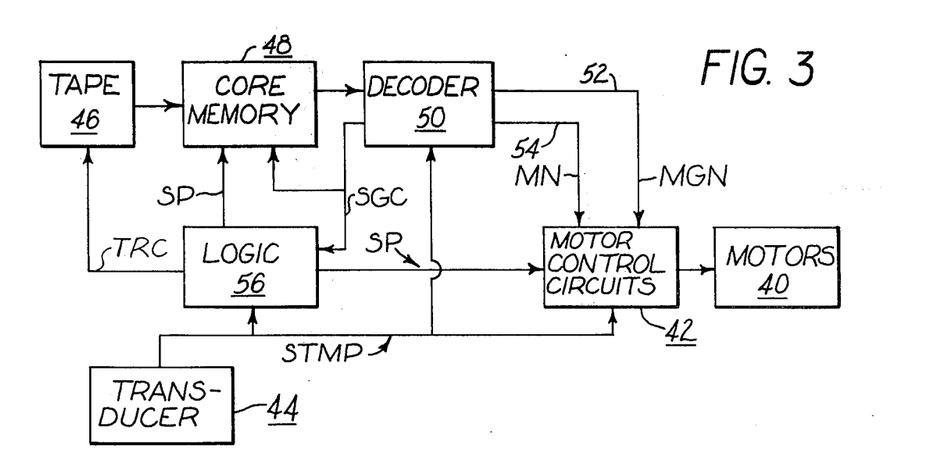
FIG. 3 is a simplified block diagram of a control arrangement for the carpet-tufting machine of FIG. 1
Figure 4:
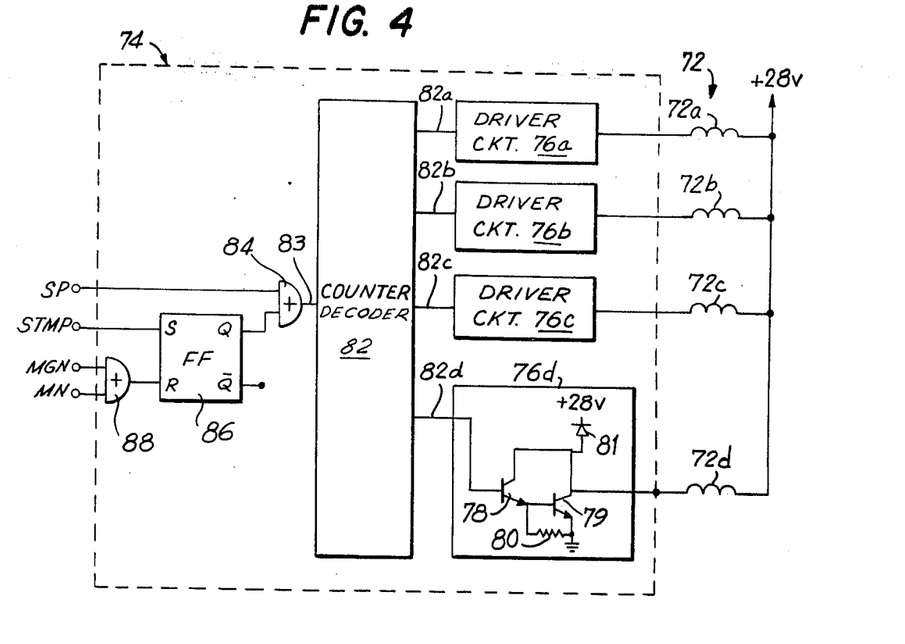
FIG. 4 is a schematic diagram of a single motor, and a block diagram of the motor control circuit therefor, adapted for use in the control arrangement of FIG. 3.

Referring now to FIG. 3, there is shown a simplified block diagram of the control system of the system described in the above cited patent. At the righthand side of this diagram there is a block marked "Motors 40" which represents the 1,440 yarn-delivery stepping motors associated with the 1,440 needles. Each stepping motor in the block 40 is connected to an individual control circuit. These circuits are shown, collectively, in a block marked "Motor Control Circuits 42." A detail of one such control circuit is shown in FIG. 4 and is described below. As the needle bar 14 moves downwardly and the needles 15 pierce the backing material 11, a position-sensor transducer (shown schematically at 44 in FIGS. 2 and 3) connected to the needle bar provides an electric signal indicating that the needles are in a desired position for yarn feed. This signal, designated STMP, is applied to the motor control circuits 42 and enables the 1,440 motor controls to receive pulses generated elsewhere on the system to activate the motors. Information as to when the motor controls are to be disabled (i.e., when the stepping motors are to be turned off) or, put another way, information as to the number of steps each stepping motor is to take in each cycle, is stored in a magnetic tape shown by block 46. The information on the tape is arranged in records. Each record contains pre-programmed instructions for a single needle bar movement cycle, i.e., instructions for one transverse row of tufts across the width of the backing material. Prior to the beginning of each such cycle, the record associated with that cycle is transferred from the tape 46 into a core memory 48. This is necessary because the core has a faster read-out time than that of the tape, and this faster read-out time is required for operation of the tufting machine at commercially acceptable speeds.

The information in each record is arranged in 32 blocks. Each block is associated with a different step of the stepping motors. The first block controls the first step of the stepping motors. The second block of information contains the addresses of those motors which are to be turned off after two steps of the motor, i.e., after enough thread has been dispensed for the back-stitch. (It will be recalled that, in every cycle, the first two steps of the motors meter ⅛ inch of yarn to span the back-stitch space between adjacent rows of tufts, and that this ⅛ inch length of yarn must be provided regardless of whether or not a tuft is to be formed). The third block of information contains the addresses of those motors which are to be turned off after three steps of the motor (i.e., after a tuft 1/32 inch high) has been made; and so on for each additional block.

The information in each block is arranged by group number and motor number. For example, if it is programmed that the 100th motor will be turned off after the back-stitch, i.e., after two steps of the 100th motor, then in the second block of information there appers the identification for the 100th motor. In this example, the motors are arranged in groups of 96 each, and there are 15 groups of motors. Thus, the 100th motor is identified as Group 2, Motor Number 4. After the second step of the stepping motors, the third block information is read out from core 48 to a decoder 50. It has an input for receiving the block of information, and two sets of output leads, shown schematically as 52 and 54. One set 52 of 15 output leads is for Motor Group Number "MGN" signals. When a Motor Group Number is received by the decoder 50 from the core 48, a signal is provided on one of these 15 MGN output leads 52; this signal remains on that output lead until the next MGN signal is received. In the second set of 96 output leads, each lead corresponds to a different motor number and, when a Motor Number "MN" signal is received by the decoder 50 from the core 48, a signal is provided on one of these output leads 54, corresponding to the motor number received. The output leads 52 and 54 from decoder 50 are connected to the motor control circuits 42.

Each block of information terminates with a block or "step group complete"("SGC") command which is used for control purposes. This SGC command indicates that the block of information has moved from the core memory 48 through the decoding matrix, and that those motor controls which are to be turned "off", have been turned off, and that those stepping motors whose controls are still "on" may now advance.

The proper timing or synchronization of the various parts of the control system is supervised by a logic circuit 56. The logic circuit 56 receives the STMP input signal (which marks the beginning of the yarn feed cycle) from the transducer 44, and the SGC signal (which marks the completion of reading a block of information). The logic circuit 56 performs many functions. It (1) supervises the transfer of the records from the tape 46 to the core memory 48, (2) supervises the transfer of the blocks of information from the core memory through the decoder 50 to the motor control circuits 42, (3) synchronizes the stepping of the motors 40 after each block of information has been decoded, and (4) initiates the reading of the next block of information after the stepping motors have stepped. The command signals from the logic 56 to perform these functions flow through the leads which are shown schematically in FIG. 3 joining it to core memory 48 and through core memory 48 to decoder 50, to tape 46, and to motor control circuits 42, and are marked SP, TRC, and SP, respectively. Details of part of the logic 56 are described below in connection with FIG. 6.

Referring now to FIG. 4, there is shown a schematic diagram of a single motor 72 and its control circuits 74. There are 1,440 such motors in the block 40 of FIG. 3, and 1,440 such motor control circuits in the block 42 of FIG. 3. The motor 72 is shown schematically as a four-winding stepping motor having windings 72a, 72b, 72c, and 72d. These windings have two terminals each, one connected to a source of potential, shown here as +28 volts, and the other connected to an individual driver circuit, 76a, 76b, 76c, and 76d, respectively, in the control circuit 74. When the motor terminal connected to one of these driver circuits is at ground potential, the rotor of the stepping motor 72 rotates to a position corresponding to that of the winding connected to that circuit; and the rotor then remains locked in that position so long as ground potential is applied to that winding. By applying ground potential sequentially to windings 72a, 72b, 72c, and 72d, and then again repeating their energization in this order, the rotor of the stepping motor rotates.

The driver circuits 76a, 76b, 76c and 76d are identical, and one of these circuits is shown in detail in box 76d. This driver circuit has two transistors 78 and 79 whose collectors are connected in common through motor winding 72d to a source of potential, shown here as +28 volts. The base of transistor 78 is connected to receive an input signal through a lead 82d, and its emitter is connected to the base of transistor 79. Transistor 79 has its emitter connected to ground potential, and its collector connected to an output from the driver circuit which goes to the motor winding 72d and the +28 volts source. A resistor 80 is connected between the base and emitter of transistor 79. When the driver circuit is not activated, and both the transistors are off, this resistor maintains the base and emitter of transistor 79 at the same potential, and thus insures that it remains in the non-conducting or "off" condition. Driver circuit 76d is "off" when a ground, or negative potential, is applied at the base of transistor 78 through lead 82d. In this condition, transistors 78 and 79 are held non-conducting because the bases and emitters of each transistor are at the same potential. Because the motor winding 72d is connected to the collector of transistor 79 the output of the driver circuit 76d is maintained at +28 volts, and the motor winding 72d connected to this driver circuit is not activated. When an input signal of, for example, +5 volts is applied through lead 82d to the input to the driver circuit, i.e., at the base of transistor 78, transistor 78 is switched "on" or conducting, and is driven into saturation. This, in turn, produces a potential difference across resistor 80 which switches transistor 79 "on", rendering it conducting and into saturation. Thus, saturated transistor 79 essentially has a short-circuit between its collector and emitter, and the output of the drive circuit, at the collector of transistor 79, changes essentially to ground potential. Current now flows from the +28 source connected to the motor 72 through the winding 72d, through the collector to emitter of transistor 79, to ground. This current flow advances the stepping motor 72 to the angular position corresponding to the winding 72d. So long as transistors 78 and 79 remain conducting, i.e., the driver circuit remains "on", the stepping motor 72 is locked in the position of the winding which is activated, here 72d. When the driver circuit 76d is turned off to step the motor forward, a damping diode 81 provides a path through which current flowing in the winding 72d can be dissipated.

Each of the four driver circuits 76a, 76b, 76c, and 76d, are connected to and are driven by a counter decoder 82. The counter decoder may be any convenient or conventional binary counter decoder of a kind adapted to receive input pulses on an input lead 83 and sequentially provide output signals on four output leads, 82a, 82b, 82c, and 82d. For example, if, in response to a first pulse, an output signal appears on output lead 82a and activates driver circuit 76a, then, upon receipt of the next input pulse, the output signal will be withdrawn from driver 76a and an input signal will be provided on output lead 82b, thus activating driver circuit 74b; and so on for subsequent input pulses, thus providing output signals on the third and then the fourth output leads 82c and 82d. However, at the fifth input pulse, a signal will be provided once again on the first output lead, thereby beginning the repetition of the stepping motor energization cycle.

The input to the counter decoder 82 is a train of "step pulses" (SP) which are selectively passed to the counter decoder 82 by circuits 88, 86, 84 which are controlled by three signals (1) STMP, the signal produced at the beginning of a cycle; (2) MGN), the motor group number signal; and (3) MN, the motor number signal. The last two signals come from the decoder 50. The train of SP pulses are, typically, 1 microsecond in duration, and uniformly spaced one millisecond apart. The SP pulses originate in the logic circuit 56, and each pulse (except the first in each cycle) is provided only after a complete block of information has been decoded and the "step group complete" signal (SGC) has been decoded from the decoder 50. SP pulses are equally spaced in time and are used to advance the stepping motors. The SP pulses are enabled, or disabled, i.e., passed or blocked, by a circuit made up of AND gates 88 and 84, and a flip-flop 86. AND gate 84 has two input terminals and a single output terminal. It has the characteristic that so long as signals (e.g. +5 volts potential) are applied simultaneously at both its inputs, an output signnal (e.g. +5 volts) appears at the output terminal. For example, should a signal (e.g. +5 volts) appear on the lower input terminal and an SP pulse (e.g. +5 volts for one microsecond duration) appear on the upper input terminal, then pulses of +5 volt amplitude and of one microsecond duration will appear at its output terminal. However, should there be no input signal on the lower input terminal of AND gate 84, e.g. zero volts, and should the SP pulse arrive at the upper input terminal, this pulse would be blocked and no signal would appear at its output terminal.

The lower input terminal to AND gate 84 is connected to an output of a flip-flop 86. The flip-flop 86 may be any convenient or conventional binary or bistable multivibrator circuit, of a kind having a pair of input terminals, set S and reset R, and an output terminal Q and $\overline{Q}$. When a signal is applied at the set input S, a signal appears and remains on the set output Q. When a signal is applied on the reset input R, the signal is withdrawn from the set output Q, and a signal appears on reset output $\overline{Q}$. (The reset output $\overline{Q}$ of flip-flop 86 is shown as not being used in FIG. 4).

The set input S of flip-flop 86 is connected to receive the STMP signal, and it receives a pulse thereon when the needle bar moves toward its down position, and prior to the first block of information being read out of core memory 48. This sets the flip-flop 86 and produces a signal (e.g. +5 volts) on the set output Q, thus partially enabling AND gate 84. At the end of the first block of information a step pulse SP appears on the SP lead, which pulse passes through the AND gate 84 to advance the counter decoder 82 and activate the next driver circuit to advance the stepping motor 72.

The reset input R of flip-flop 86 is connected to an AND gate 88, which is of the same operational characteristics as AND gate 84. One input to AND gate 88 is a particular motor group number (MGN) lead, while the second input is connected to a particular motor number (MN) lead.

As an example, if this circuit shown in FIG. 4 is programmed to be turned off after the second step, there will appear on the MGN lead and the MN lead to gate 88 after the second SP pulse (i.e., two steps of the motor to dispense thread for the back-stitch) but before the third SP pulse, MGN and MN pulses of overlapping duration. When these pulses appear simultaneously at gate 88, they pass through the gate 88 to the reset terminal R of flip-flop 86, resetting this flip-flop. This, in turn withdraws the signal from the set output Q of the flip-flop 86, thus disabling AND gate 84. Subsequently, when a pulse (the third SP pulse in this stitching cycle) appears on the SP lead to drive those stepping motors which have not been turned "off", it will not drive this motor because this stepping motor control circuit 74 has been turned off, gate 84 being disabled without a signal from flip-flop 86, so that the pulses on the SP lead do not pass through AND gate 84 to operate this motor 72. Whichever driver circuit 76 previously was activated, remains activated, and the stepping motor is locked in that position with current flowing through the winding which was activated last before the control was turned off. Subsequent step pulses appearing on the SP lead are barred from the counter 82 and the driver circuits 76, and thus there is no further advance of this stepping motor 72 until the next cycle.

In the next cycle, after the backing material 11 has advanced and the needle bar 14 has driven the needles 15 downward through the backing material, a new signal appears on the STMP lead, which sets the flip-flop 86, thus partially enabling AND gate 84 to allow step pulses SP appearing on the SP lead now to pass into the counter decoder 82 and advance the stepping motor 72. In this next cycle, the motor 72 will be driven by the SP pulses until the control is turned off by signals appearing simultaneously on both inputs to AND gate 88 (i.e., on the MGN lead, and the MN lead).

In the example used herein, there are 1,440 control circuits of the kind shown in FIG. 4. The SP lead is connected to the AND gate 84 in all of these 1,440 control circuits. The motor group number leads MGN, of which there are 15, each are selectively connected to the 96 different control circuits, and the motor number leads MN, of which there are 96, each are connected to 15 different control circuits, namely the Motor Number 1 lead (MN-1) is connected to the first motor control circuit to which is connected the first Motor Group Number lead (MGN-1), the second motor number lead group (MGN-2), the third motor group number lead (MGN-3), and so forth, to the 15 motor group number lead (MGN-15). The motor number lead 2 (MN-2) is connected to the second motor control circuit to which is connected the first motor group number lead (MGN-1), and to the second motor control circuit, to which is connected MGN-2 lead, and so on, until the MN-2 lead to the control circuit to which is connected the MGN-15 lead; and so on up to the 96th lead (MN-96) which is connected to the 96th motor control circuit of that first group to which is also connected the MGN-1 lead and to the 96th motor control circuit of that group which is also connected to the MGN-2 lead, etc. for the MN-96 lead to the control circuit to which is connected the MGN-15 lead. In summary, each of the AND gates 88 in the 1,440 motor control circuits has a different and unique combination of one MGN input lead (MGN 1 through 15) and one MN input lead (MN 1 through 96). By this arrangement, each of the 1,440 motor control circuits can be identified by the coincidence of a single MN signal plus a single MGN signal.

Figure 5:
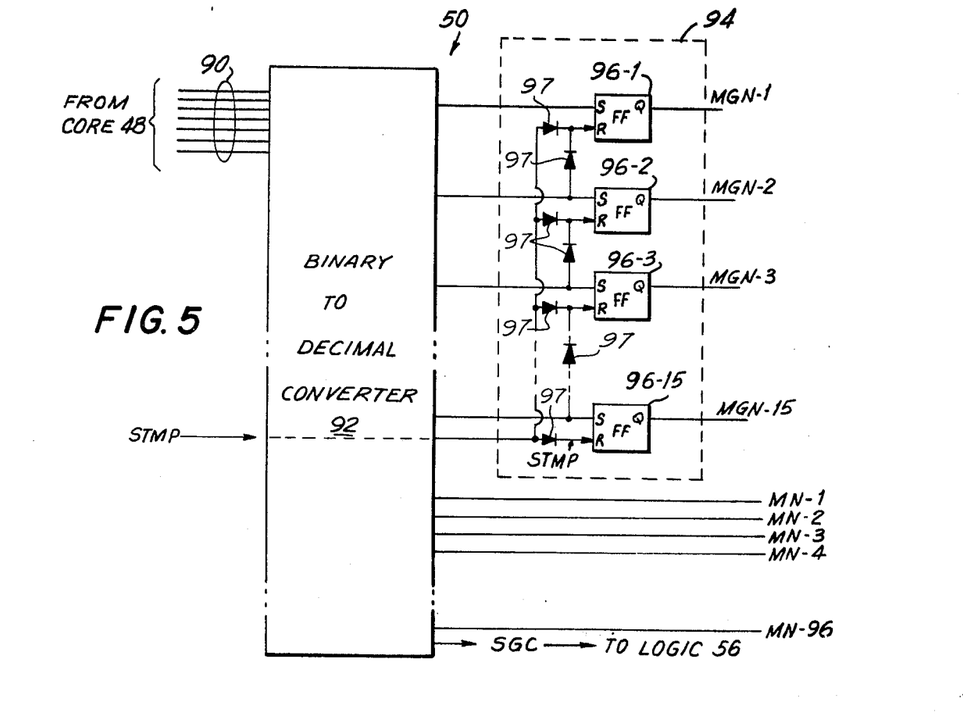
FIG. 5 is a schematic and block diagram of a decoder adapted for use in the control arrangement of FIG. 3.

Referring now to FIG. 5, there is shown a detailed block diagram of the decoding circuit 50 of FIG. 3. This circuit has an input 90 for receiving data from the core memory 48, and 15 motor group number MGN output leads, MGN-1 through MGN-15, and 96 motor number MN output leads, MN-1 through MN-96. These leads are connected to the motor control circuits 42, as described above. The decoding circuit 50 receives information from the core which is a "record" of information, i.e., the instructions for one complete yarn dispensing cycle. This record is made up of 32 blocks of information, each block is associated with a particular step of certain motors, and each block contains the motor group number MGN and motor numbers MN of those motors which are to be turned off prior to the next step of the stepping motors. Further, each block of information (except the last) terminates with a step group complete signal SGC.

The motor group numbers MGN and motor numbers MN are transferred from the core 48 into the decoder 50, one at a time. Each number is binary coded, as a 7-bit character, which is applied to the decoding circuit 50 on seven input leads 90, at the upper left hand side of FIG. 5. The numbers from the core 48 arrive sequentially in the following order: a motor group number (MGN) followed by the motor numbers (MN) of those motors in that group which are to be deactivated. The decoder 50 includes binary to decimal convertor 92 of any convenient or conventional design adapted to receive a binary character of at least seven bits and having 112 output leads, and adapted to provide a signal (e.g. +5 volts) on any one of these 112 output leads in accordance with the input binary character, the first 15 output leads corresponding to the motor group numbers MGN-1 through MGN-15 and the next 96 output leads corresponding to the motor numbers MN-1 through MN-96. The final output lead corresponds to the stop group complete signal SGC. For example, a motor group number 2 code (MGN-2) will produce a signal on the second output lead from the convertor. A motor number 4 (MN-4) will produce a signal on the MN-4 output lead. Such decoding circuits are conventional and therefore there is no need to give a detailed explanation of the internal components and wiring of the decoder 92.

The motor group number MGN signal must be provided at the output of the decoder 50 for such time as motor number MN signals associated with that group are also being decoded, or until the next motor group number MGN appears. It will be noted that the motor control circuit 74 of FIG. 4 is disabled upon the simultaneous occurrence of the motor group number MGN and motor number MN associated with that particular motor control circuit. Thus, the motor group number MGN signal must be maintained while the motor numbers MN, associated with that group, are being decoded. To achieve this end, a latching circuit 94 is connected to the first 15 motor group number outputs from the convertor 92. The latching circuit includes 15 flip-flops, shown here as 96-1, 96-2, 96-3, ... through 96-15. The post-script after the hyphen indicates that the flip-flops are associated with that motor group. The set terminal S of each of the flip-flops 96-1 through 15 have their set inputs connected to the first 15 outputs from the converter 92, respectively. The set outputs Q of the flip-flops are connected to the motor group number leads MGN-1, MGN-2, ... through MGN-15, respectively. The reset input of the first motor group flip-flop 96-1 is connected to the set input S of the second motor group flip-flop 96-2, and each succeeding flip-flop 96-2 through flip-flop 96-15 has its reset input R connected to the set input of the next or higher stage group number flip-flop. The reset terminals R of all the flip-flops 96-1 through 96-15 also are connected to the STMP lead. Diodes 97 are connected between the STMP lead input and the lead from each of the next or higher stage group number flip-flops and in the set S to the reset R leads to prevent false triggering. Thus, at the beginning of a stitching cycle, all of the flip-flops 96-1 through 96-15 in the latching circuit 94 are reset. Upon occurrence of the first motor group number MNG a signal appears on the set lead S of flip-flop 96-1, setting the flip-flop and providing a signal on the MGN-1 lead. Any motor numbers MN immediately following this motor group number MGN are decoded and a signal is sent out over the appropriate motor number lead MN-1 to MN-96. Upon the reading and decoding of the next motor group number MGN, a signal appears on the second output of the convertor 92. This signal is applied simultaneously to the reset terminal R of flip-flop 96-1 and to the set terminal S of 96-2. This resets flip-flop 96-1 withdrawing the signal from the MGN-1 lead, and sets flip-flop 96-2, thus providing a signal on the MGN-2 lead. The operation of the converter 92 and the latching circuit 94 continues in the same fashion for the remaining 13 motor groups, after which the operation is repeated for the next block of information for the next tufting cycle. At the end of each block of information there appears a 7-bit character identifying the end of the block, i.e., that the next stepping of the motors now may proceed. This character is decoded by the converter 92 and provides a pulse on the 112th output lead from this converter 92. This lead, and the signal on it, are called step group complete SGC.

Figure 6:
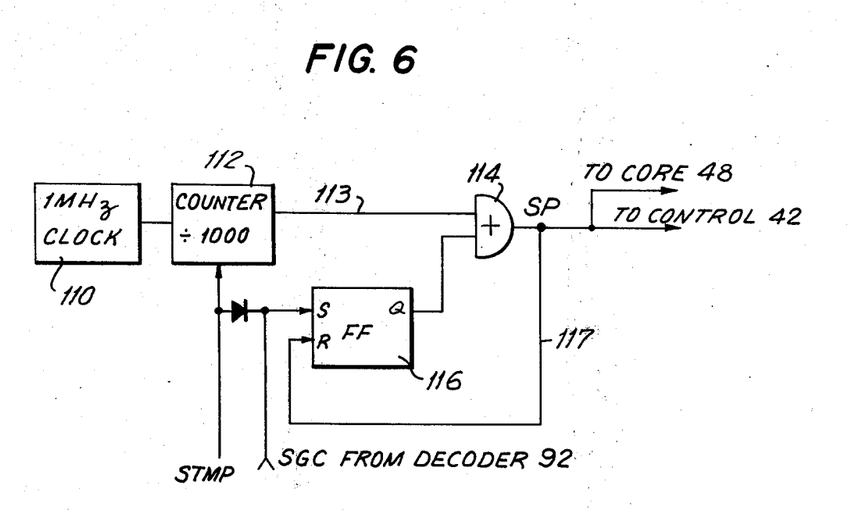
FIG. 6 is a block diagram of a portion of the logic circuit of FIG. 3.

Referring now to FIG. 6, there is shown a block diagram of a portion of the logic and control circuit 56 of FIG. 3. This portion of the logic circuit provides the step pulse on the SP lead which is applied to the AND gates 84, in 1,440 motor control circuits (FIG. 4), to advance the motors at the properly synchronized instants of time. A signal on the SP lead also is applied to the core memory 48 to initiate the reading of the next block of information from the core. The inputs for this portion of the control circuit of FIG. 6 are the STMP signal which marks the beginning of a yarn-dispensing cycle, and the step group complete SGC signal from the decoder 50 which occurs at the end of a block of information.

In FIG. 6 there is shown a one megacycle clock 110 which provides pulses at a frequency of 1 megacycle per second. These pulses are applied to a counter 112 which divides the 1 megacycle pulse train by 1,000 and produces one pulse at its output for each 1,000 pulses received; thus the counter 112 produces a pulse on lead 113 once every millisecond. This pulse is the basic timing pulse for synchronizing the advance of the counter decoder 82 in the motor control circuit (FIG. 4) which causes the stepping motors to advance. The STMP signal also is applied to the counter 112. This pulse sets the counter in block 112, and synchronizes the beginning of the step pulses SP produced by the counter 112 to occur when the needle bar 14 reaches the position at which yarn feed is to start. The counter 112 may be any convenient or conventional counter circuit of a kind which receives a train of input pulses and provides a signal output pulse after a predetermined number of input pulses have been received, i.e., 1,000 input pulses in the present example.

It will be appreciated that the speed of operation of the stepping motors is determined by the frequency of the pulses coming from the counter 112. In the present example, there is one output pulse from the counter each millisecond. Thus, an elapsed time of 32 milliseconds is required to feed the maximum of 32 increments of yarn. If it is desirable to operate the yarn-feed mechanism at a faster rate, the counter 112 may be adjusted to produce pulses more rapidly, for example, one every 700 microseconds, or one every 500 microseconds. The latter rate would operate the machine twice as fast in the embodiment described herein. The speed of the operation also is limited to a large extent by the time required to transfer the information from the tape to the core memory. As faster peripheral equipment is used with the system of the invention, the counter 112 may be adjusted as pointed out above to put out one output pulse for every 700 received pulses, or for every 500 received pulses.

This feature of being able to set the speed of the tufting machine by adjusting the counter setting adds to the versatility of the overall system of the invention.

The pulses on lead 113 are applied to one of two inputs of an AND gate 114. If this gate is partially enabled by a signal from a flip-flop 116 on its second input, then the pulse on head 113 passes through the gate 114 to the output SP lead and is applied over the SP lead to the 1,440 motor control circuits. The set terminal S of the flip-flop 116 is connected to the STMP lead through a blocking diode, and also to the SGC lead from the decoder 92 which carries the decoded step group complete signal SGC. This step group complete signal SGC is provided at the end of each block of information (each block corresponding to one step of the stepping motor). Thus, after the instructions for one step of the motor have been applied from the decoder 50 to the motor controls 42, the step group complete signal SGC is applied from decoder 50 to flip-flop 116 in the logic circuit. This SGC signal sets the flip-flop 116 and this, in turn, partially enables AND gate 114. The motor control circuits 42 are now ready to receive the step pulses SP to advance those motors whose control circuits have not been previously turned off by MN and MGN signals from the decoder 50.

The output pulse on the SP lead is also fed back by a conductor 117 (and if needed through a suitable time delay circuit (not shown)) to the reset input terminal R of flip-flop 116; this pulse which resets this flip-flop also withdraws the output signal from the set output terminal Q of flip-flop 116 and thereby disables AND gate 114. Thus, the subsequent step pulse SP cannot be applied to the motor control circuits until the next block of information is read out from the core 48, decoded, and the step group complete signal SGC in that block has been applied on lead SGC to set the flip-flop 116.

The last block of information in each record does not end with a step group complete command SGC, but with an end-of-record command. Thus, the flip-flop 116 is not set at the end of the last block and subsequent pulses from the counter 112 are not passed through the AND gate 114. Of course, the motor control circuits identified in this last block are disabled or turned off, thereby providing a double-check against false stepping of the motors:—first blocking the SP pulses, second turning off all the motor control circuits.

The system is designed to dispense yarn at a constant rate, e.g. the stepping motors can feed 1/16th inch of yarn each millisecond, pursuant to the 1 millisecond pulses from the counter 112. It is expected that almost all those motors which are to be turned off after a given step of the motors can, in fact, be turned off before the next step pulse arrives, i.e., within 1 millisecond period. It has been found, however, that in certain circumstances (e.g. turning off all the motors after one step) it is not possible to complete this turning off in the one millisecond period. The logic circuit 56, and particularly flip-flop 116, inhibits a subsequent occurring pulse from counter 112 until all of the motor controls associated with the last block of information have been deactivated. For example, it requires about 1 microsecond to read one character from core, decode it, and deactivate the identified motor control circuits. If all the motors are to be turned off at the end of one step, the block of information associated with the next step contains 15 motor group numbers (MGN) and 1,440 motor numbers (MN) plus one step group complete SGC character. It takes approximately 1.5 milliseconds to decode and deactivate the motor controls for this large block of information. It is important that the step pulse SP not be applied to the motor control circuits before all of them are deactivated. Thus, when a pulse is provided from counter 112 on lead 113 one millisecond after the previous stepping of the motors, it is blocked by AND gate 114, due to flip-flop 116 not having been set because no step group complete signal SGC from decoder 92 was applied to the flip-flop 116. This step group complete SGC signal will occur approximately 500 microseconds later. Thus, one step pulse SP is skipped and it is the subsequent output pulse from the counter 112 which passes through the gate 114. This step, and subsequent steppings of the motors, would be one millisecond apart but time-delayed one millisecond from the original starting step pulse SP. This gap in the stepping pulses does not significantly affect the constant rate of yarn feed for those motors which are still on. As a practical matter, there will be only one extra space between adjacent pulses in this example, and this occurs only if more than approximately ⅔ of the motors are to be turned off after one step (approximately 980 motors in that step); and this, of course, can only occur once in a tufting cycle. If it is desirable to operate the tufting machine at faster speeds, such as providing a step pulse every half millisecond, it might be necessary to postpone or interrupt the equally-spaced pulse periods for as many as two pulses.

The flip-flop 116 performs an additonal function. If, in a record of information, the instructions in the eighth block (i.e., after the eighth step of the motor) become lost (this is an occasional occurrence in computers where a portion of a record of information can be lost), then the flip-flop 116 will stop all the motors after th eighth step. After the seventh block of information, a step group completes signal SGC is applied to flip-flop 116 setting the flip-flop. The counter 112 provides a step pulse for the eighth stepping of the motors which advances those motors which have not yet been turned off, and the step pulse from AND gate 114 also is fed back on lead 117 to reset flip-flop 116. The instructions, however, for the ninth through the thirty-second steppings of the motors have been lost from the record. Thus, there is no means for applying a step group complete SGC signal to set flip-flop 116. Thus, subsequent pulses from counter 112 are blocked by the partially disabled AND gate 114 and those motor control circuits which have not been disabled do not advance the stepping motors further because there are no SP pulses to advance the counter decoder 82 in the motor control circuits (FIG. 4). Hence, the row of tufts associated with a record having several lost blocks of information appears as a low row, i.e., no higher in this example than 3/16 inch high. This is advantageous in that an erroneous row of low tufts is not readily noticeable in the finished carpet while an erroneous row of high tufts is readily noticeable and makes the carpet commercially unusable. Thus, with this circuit, should a portion of a record be lost, the motors are disabled in the absence of a portion of a record for that missing portion, with the result that the lost portion produces a commerically acceptable row of low tufts, rather than an unacceptable row of high tufts.

The first SP pulse which causes the first step of the motors in each yarn dispensing cycle is initiated by the STMP signal. This permits the motors to begin stepping in each cycle as soon as the STMP pulse is produced.

The step pulse signal SP and step group complete signal SGC also are used to regulate the transfer of information from the tape to the core memory 48. Typically, the transfer of information from the core 48 to the decoder 50 is quite rapid, e.g. one microsecond per character. The transfer of information from the tape to the core, however, is much slower, typically 15 microseconds per character. Thus, to read an entire record of approximately 1500 characters from core to decoder takes approximately 1.5 milliseconds, but to load this record of information into the core from the tape takes approximately 22.5 millisconds. Hence, if a needle-bar movement cycle has a duration of 40 milliseconds, it is necessary to read the information from the tape to the core during those time intervals when the information is not being read from core to the decoder 50. The core 48 is divided for convenience into two portions. Information is read out of one portion of the core into the decoder, while the next record of information is being read from the tape into the other portion of the core. This core memory, however, is of a kind which does not permit the simultaneous reading into the core and reading out of the core; thus it is necessary to read from the tape into the core during those intervals when the information is not being read out of core. To achieve this, the step group complete SGC and step pulse SP signals are used. The step pulse signal SP from logic 56 not only advances the motor circuits, but also is applied to the core 48 to initiate the reading of the next block of information from the core into the decoder. The step group complete signal SGC from decoder 50 indicates that this block of information has been read from the memory and has been decoded. The step pulse SP occurs at periodic intervals, and there is an increment of time between the step group complete pulse SGC from decoder 50 and the occurrence of the step pulse SP. This time increment is used to read a next piece of information from the tape into the core memory. Particularly, the step group complete signal SGC from that portion of the core being used for readout is used to initiate a transfer of information from the tape into that portion of the core that is not being used for readout. This reading from tape to core continues until the step pulse SP occurs which also is applied to the tape and core memory and stops the reading from the tape. This is repeated until the entire record is read from the tape to memory. Since a stitching cycle is 40 milliseconds, and since it takes approximately 1½ milliseconds to read a record out of core, there remains approximately 38½ milliseconds to read from tape to core, certainly sufficient time for the transfer considering that only approximately 22½ milliseconds are needed.

Figure 7:
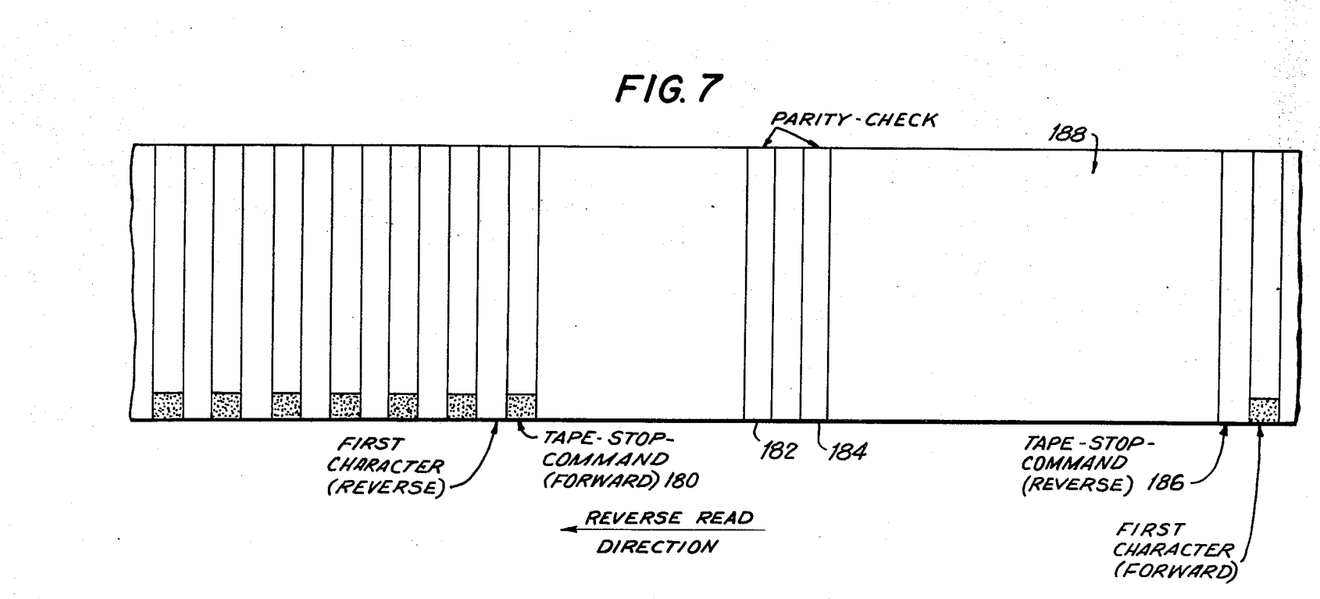
FIG. 7 is a schematic diagram of a portion of a control tape, adapted for use in the control arrangement of FIG. 3.

Referring now to FIG. 7, there is shown schematically a portion of a magnetic tape containing the last few instructions of one record and the first few instructions of a subsequent record. Carpets produced by this machine usually have a pattern which repeats along the length of the carpet, for example, up to every 36 inches. The instructions for one repeat of such a tufting pattern are stored on a length of magnetic tape. Since carpet is made in a continuous strip and since the pattern is repeated, it is necessary to reread the instructions on the tape from the beginning after each patterned carpet is completed. Normally, after making one pattern repeat in the carpet, the tape is at the last instruction which is at the end of the tape. To repeat the pattern, the machine would then require the first instruction which is at the beginning of the tape. In the present invention, in order to eliminate rewinding of the tape to the first instruction, a second set of instructions are interlaced with the first set of the instructions but in a reverse direction, e.g. the instructions for two repeats are interlaced with each other in reverse directions. Alternatively, a single set of instructions for a single pattern repeat could be divided into two interlaced groups of instructions. This is shown in FIG. 7 where the characters to be read in the forward direction are marked with a dark spot in the bottom-most position, and those without this mark are read in the reverse direction. By this arrangement, the first half, or one complete set, of the instructions are read during the forward movement of the tape, and the second half, or second complete set, are read during the reverse movement of the tape. When the end of the tape instruction at either end is reached, the tape is reversed in direction upon reading a tape reversal instruction character. Thus, by shuttling the tape (once forward and once backward) carpets are produced continuously, and without rewinding the tape.

With this arrangement a problem arises, however, with the use of standard IBM format characters on the tape. At the end of each record of information (i.e., the instructions for one transverse row of tufts) there is a stop character signal (180 in FIG. 7) followed by two parity-check characters, 182 and 184. In reading of the tape in the forward direction, when a forward-tape-stop-command 180 is sensed, this signal is decoded and the logic receiving data from the tape is switched off; the tape drive is then commanded to stop and the tape drive coasts to a stop at a point which is beyond the parity-check characters, 182 and 184. Thus, when the tape drive is started again, it begins reading the next record of information and does not read the parity-check characters. However, when reading in the reverse direction, i.e. from right to left in FIG. 7, once a reverse direction tape-stop-command is detected at point 186, the logic receiving data from the tape drive is switched off. The tape drive then is commanded to stop, and the tape drive coasts to a point at approximately 188, i.e., before the parity-check characters 182 and 184 are reached. When instructions are received from the machine to begin reading from the tape again, the first two characters read in the reverse direction are the parity-check characters 182 and 184. These parity-check characters, if entered into the control system for the tufting machine, would cause an improper operation of the yarn feeding mechanisms.

Figure 8:
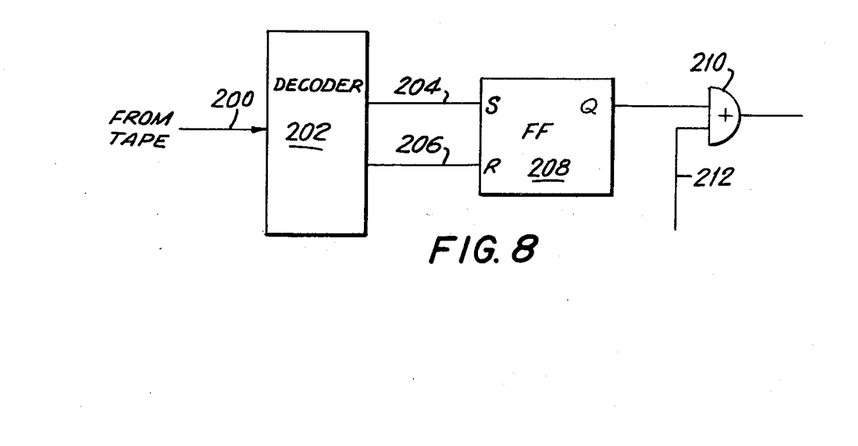
FIG. 8 is a block diagram of a logic circuit according to the invention for use in conjunction with reading the tape of FIG. 7.

This difficulty is overcome by a circuit according to the present invention, shown in the schematic diagram of FIG. 8, which is a circuit to prevent the parity check characters from affecting the control system. This arrangement thereby permits the use of standard IBM format tape in which records of information are interleaved to be read in forward and then reverse directions. In the circuit of FIG. 8, information from the read heads is applied through a lead 200 to a small decoder 202. This decoder is sensitive to a tape-stop-command in the forward direction and to a tape-stop-command in the reverse direction, and provides an output pulse on a lead 204 in response to decoding a tape-stop-command in the forward direction and a pulse on lead 206 in response to decoding a tape-stop-command in the reverse direction. A flip-flop 208 has its set input terminals and reset input terminal R connected, respectively, to leads 204 and 206 from decoder 202. The set output Q from this flip-flop 208 is connected to an AND gate 210. A second input to AND gate 210 is a logic signal instructing that data be received from the tape. The circuit of FIG. 8 is effective only when the tape is running in the reverse direction. A third input may be applied to gate 210 to provide an output signal only whenn the tape is moving in the reverse direction. Upon the sensing of a reverse direction tape-stop-command, decoder 202 provides a signal on lead 206 which resets flip-flop 208. This withdraws the signal from the set output Q of flip-flop 208 and disables AND gate 210. When the tape drive is switched on again, a signal to receive data is applied to the second input on lead 212 of the AND gate 210. However, AND gate 210 is disabled due to the absence of a signal on its first input lead. As the read head passes over the parity-check characters 182 and 184, they are read into the decoder 202, but they are not read into the logic-receiving data circuit, i.e., the core memory. The next character sensed is from the forward direction tape-stop-command signal 180. This is decoded by decoder 202, which now provides a signal on its output lead 204. This sets the flip-flop 208 and provides a signal on the set output Q of flip-flop 208, thus qualifying the AND gate 210. The signal on lead 212 now passes through the AND gate 210 to the core memory and other logic circuit receiving data from the tape so that they now will receive the characters of the record which now are being read by the tape head. Thus, by the inclusion of the circuit of FIG. 8, the records of information may be interleaved so that the tape may be read in the forward and reverse direction while still employing standard IBM format tape.

It should be apparent that the parity-check character disabling circuit described above in reference to a carpet tufting machine control system is suitable for use in other stored-data control systems and the invention is not restricted in its use to control systems for carpet tufting machines nor even to systems employing magnetic tape data storage.

Furthermore, although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What I claim is:

1. A circuit for use with a data store, a data reader, and a utilization device for said data, said data store having a plurality of pairs of records interleaved with each other and a parity character unequally spaced between successive pairs of said records so as to be closer to the pair of records on one side than to the pair or records on the other side, each of said pairs of records having at one of its ends a stop-command-forward character and at the other of its ends a stop-command-reverse character, said circuit comprising: gate means for passing read data, including data embodied in said parity character, from the data reader to the utilization device; means for identifying said stop-command-reverse character and said stop-command-forward character; and means for disabling said gate means in response to identification of one of said stop-command characters at the end of a record farther from the parity character between that record and the next record and for enabling said gate means in response to identification of the other of said stop-command character; at the beginning of a next record, whereby data corresponding to said parity character will not be passed to said utilization device.

2. A circuit according to claim 1 wherein said means for disabling and enabling is a flip-flop having its set and reset inputs connected to the identifying means and its output connected to the gate means.

3. A circuit according to claim 1 wherein said data store is mechanically driven and each of said stop-command characters disables the mechanical drive for said data store and disables said data reader, said parity character being recorded physically close to said stop-command-forward character than to said stop-command-reverse character whereby said data store coasts past said parity character with said data reader disabled after receiving said stop-command-forward character, but, when being driven in reverse, coasts to a stop before reaching said parity character after receiving said stop-command-reverse character, said one of said stop-command characters for actuating the means for disabling said gate means being said stop-command-reverse character.

* * * * *